No. 797,363. PATENTED AUG. 15, 1905.
B. LEV.
SAFETY DEVICE FOR MOTOR CARS.
APPLICATION FILED JULY 13, 1903. RENEWED DEC. 3, 1904.
2 SHEETS—SHEET 1.
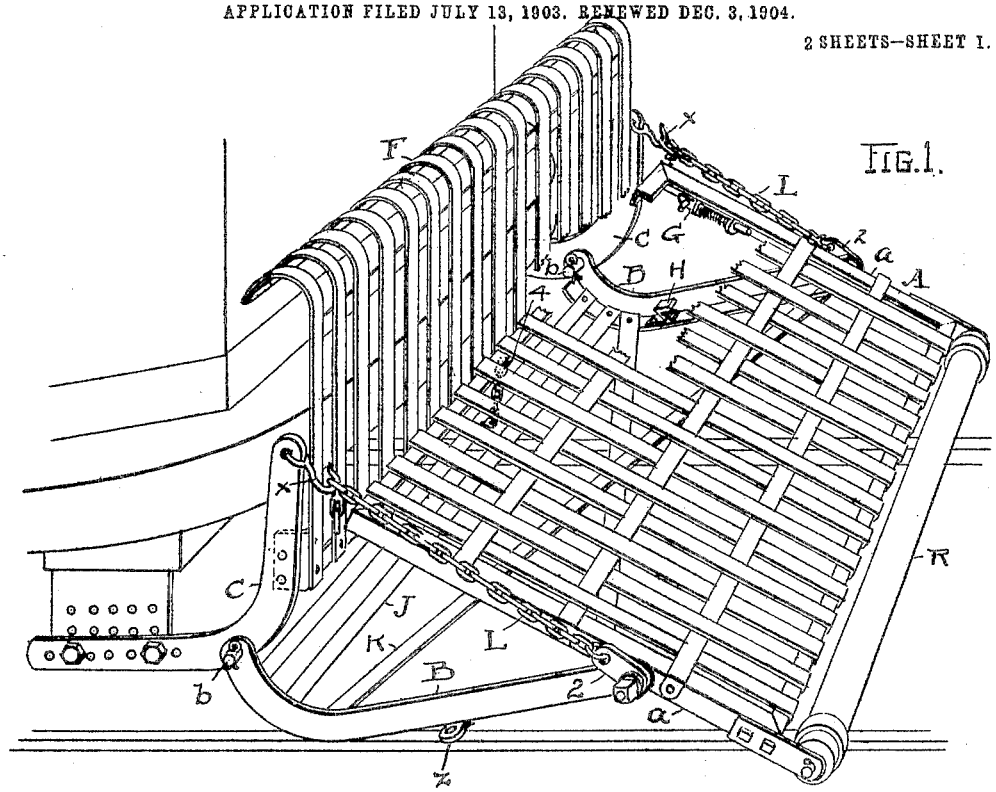
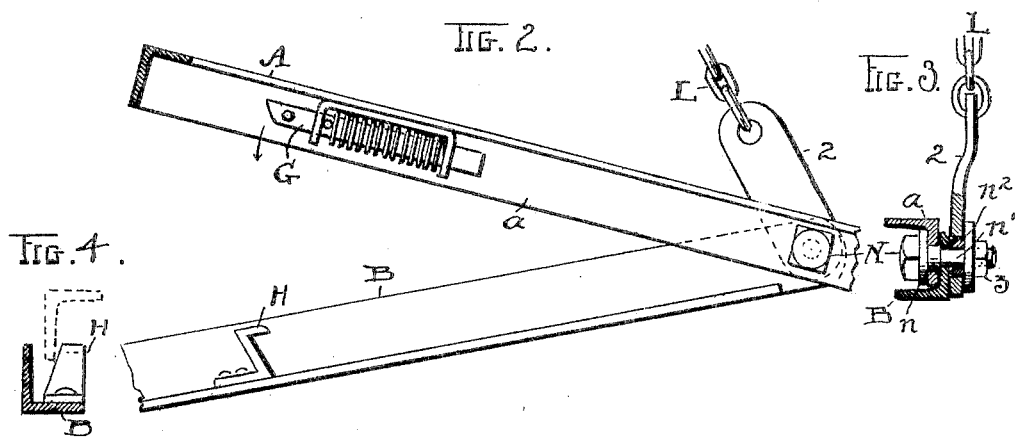
ATTEST
INVENTOR No. 797,363. PATENTED AUG. 15, 1905.
B. LEV.
SAFETY DEVICE FOR MOTOR CARS.
APPLICATION FILED JULY 13, 1903. RENEWED DEC. 3, 1904.

2 SHEETS—SHEET 2.

UNITED STATES PATENT OFFICE.

BENJAMIN LEV, OF CLEVELAND, OHIO, ASSIGNOR, BY MESNE ASSIGN-
MENTS, TO AMERICAN SECURITY AND TRUST COMPANY, TRUSTEE,
OF WASHINGTON, DISTRICT OF COLUMBIA, A CORPORATION.

SAFETY DEVICE FOR MOTOR-CARS.

No. 797,363. Specification of Letters Patent. Patented Aug. 15, 1905.

Application filed July 13, 1903. Renewed December 3, 1904. Serial No. 235,301.

*To all whom it may concern:*

Be it known that I, BENJAMIN LEV, a citizen of the United States, residing at Cleveland, in the county of Cuyahoga and State of Ohio, have invented certain new and useful Improvements in Safety Devices for Motor-Cars; and I do declare that the following is a full, clear, and exact description of the invention, which will enable others skilled in the art to which it appertains to make and use the same.

My invention relates to improvements in safety devices for motor-cars; and the invention consists in a safety device having a carrier provided with self-locking mechanism and other parts and combinations of parts, as hereinafter fully described, and particularly pointed out in the claims.

Figure 5:
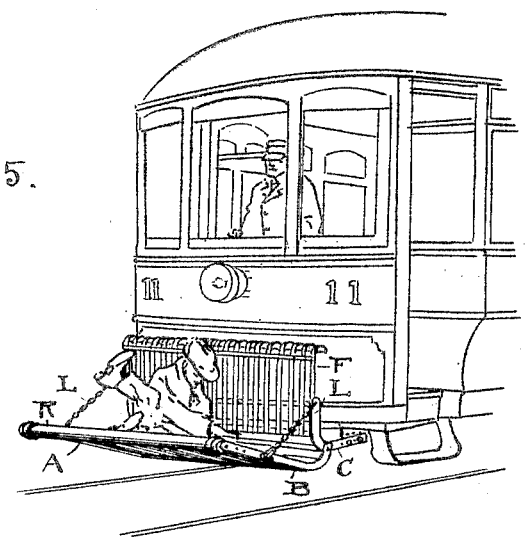
Figure 6:
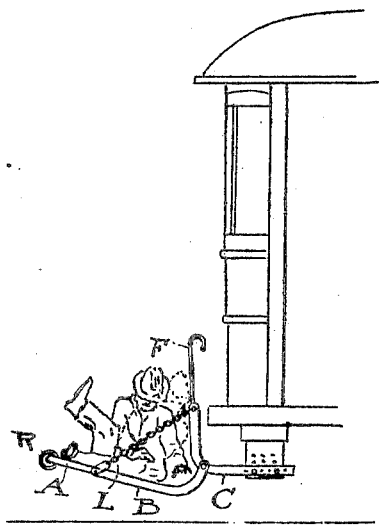

In the accompanying drawings, Figure 1 is a perspective elevation of a safety attachment and the front end of a car supporting the same, the said attachment being shown in ordinary working position. Fig. 2 is a sectional elevation of a side portion of the carrier and of one of the side arms supporting the same and showing particularly the automatic locking mechanism for the carrier. Fig. 3 is a sectional elevation, enlarged, of the pivot connection between the carrier and one of its arms and of the links engaged therewith, as hereinafter fully described. Fig. 4 is a cross-section of one of the carrier arms or bars and showing also the catch for the carrier-lock and a cross-section of one of the side pieces of the carrier in dotted lines. Fig. 5 and Fig. 6 show a perspective view and side elevation, respectively, of the mechanism and parts shown in Fig. 1, with the carrier down at the rear and locked, as occurs when an object has been thrown thereon, and in the carrier there is displayed a person who has been caught up by the carrier under a high rate of speed and is saved in the rebound from the fender.

As thus shown the invention comprises a carrier or carrier-frame A, pivoted near its middle and sides on side arms B, supports C for said side arms, and a fender or buffer F, supported in an upright position in front of the car body or frame. I do not in this case lay claim to the construction and combination of these parts as an organization or operative structure, but rather to their association and combination with an automatic lock for the safety-carrier A, whereby when the said carrier-frame is tilted downward at its rear by a picked-up object falling thereon it will be automatically locked down and so remain until purposely released. Such automatic locking mechanism has been found in actual personal tests with this style of carrier to be indispensable to personal safety, because at any speed at which a car may strike a person the rebound from the spring-fender is so great that the body is thrown violently forward, and if there be nothing to intercept or catch the body from such rebound it must almost inevitably be thrown in advance of the carrier onto the track, where it will be in immediate danger of being crushed. I do not claim for my safety device that it will pick up a prostrate form, though it may; but I do claim that it will not fail to pick up a standing figure, including a small child, because in such case the center of gravity is above the striking-point of the yielding rubber roller R, which runs about four to six inches above the surface of the track.

The foregoing statement is confirmed by my experience in repeated tests, in which I have placed myself on the track in front of cars running at speeds varying from five to twenty miles or more per hour and wherein my life would have been in very great jeopardy, especially in the higher speeds, if the carrier had not performed the additional function of carrying me after picking me up from the track. This it did and always will do when locked down at the rear the instant its reversal is completed.

In the reversal of the carrier A the front portion thereof stands up at such elevation that it catches the body as it is thrown forward by fender F, and from this reaction its natural tendency is always to gravitate into the cradle of the carrier at its rear below the fender, where it is perfectly safe.

The form or style of the automatic lock or catch for the carrier is not in itself material, and I may adopt any form that will serve the purpose; but a spring-pressed bolt G, with a catch H on arm B, has been found very reliable and satisfactory. There may also be a special stop for the rear of the carrier-frame A other than side arm or bar B and serve my purpose—that is, there might be cross-pieces or the like connecting-arms B and answer as such stop. As it is the slats or cross-pieces J and K connect said arms, and pieces J, especially, come into the cradle above mentioned.

The forward or front ends of supports C are connected with the front ends of side arms or bars B by flexible link members or chains L, and a special link 2 is fixed on the outer end of bar B by means of a bolt N, which engages through said bar and the side rail of carrier-frame and serves as an end connection for chain L. The said bolt is of a differential style, having one diameter $n$ for angle-bar $a$, forming the side of carrier-frame A, and a smaller diameter $n'$ for side arm B, while a bushing $n^2$ serves as a bearing for link 2 thereon. By these means both the carrier-frame and link 2 are left free to operate and are not bound when the bolt is tightened by the nut 3.

The fender F is designed to stand out from the car-body so as to have free action, and it rises to such elevation as to offer all needed protection to a person thrown against the same over the carrier.

Any suitable means for supporting the carrier-frame A other than shown herein may be employed. As shown, however, the elevation at which said frame runs at its front is governed by chains L, fixing the general elevation of the carrier, while the elevation of arms B is fixed by adjustable supports C. A short chain 4 limits the downward tilting of the carrier-frame at its front; but any other suitable stop for this purpose may be used.

In this description and in the claims the term "reverse position" or "reversed position" as applied to the carrier means the position when the rear of the carrier is depressed by means of a picked-up object which depresses it by its overbalancing weight. Normally the front portion of the carrier is down by reason of the greater weight of the same forward of its pivots, and only its own gravity is used to keep it down at front normally. The roller R forms the so-called "striking" member or portion of the carrier, and it runs ordinarily at such elevation as to strike a person at or near the ankles and is of cushioning or yielding construction, so as not to inflict injury when accident occurs. Bolt G and catch H might be exchanged on their respective supports and serve every purpose as well.

Part A is referred to herein as a "carrier," chiefly because of its function. In the first instance it serves as a pick-up, and then it immediately becomes a carrier, which also operates as a safety medium against the rebound from the fender. Any suitable construction of fender or cushioned buffer may be used.

The trunnion or pivot projections $b$, which support arms B upon parts C, extend in the same direction and upon the same side of the two parts C, so that arms B and part A can be bodily removed by shifting the same to one side and freeing parts B from said projections after the cotter-pins which normally hold parts B in place are removed. An eye Z, rigidly mounted upon part B, is utilized to hold arms B and part A in a raised vertical position in front of the car when said eye is brought up to and engaged by the hook X upon arms C.

It will be noticed that side arms B and cross slats or pieces J constitute together a rigid frame adapted to be handled and used as one part and in the present construction serving the important function of helping to carry an object picked up in travel. This is owing to the low level to which the rear of the carrier swings in reversing, thus leaving a gap between it and fender F to be filled by said frame, and especially the cross-slats thereof.

What I claim is—

1. A car and a spring-fender on its front, in combination with a carrier pivotally supported at the front of said fender, arms supporting the said carrier, means to raise and lower the outer ends of said arms, and means on the said carrier and said arms to lock the carrier when reversed, substantially as set forth.

2. The attachment comprising a carrier and arms on which the carrier is pivoted, and an automatic lock to secure the carrier in reversed position, one member of said lock being on one of said arms and the other on the carrier, substantially as set forth.

3. The combination of the car and the supports at the front and sides thereof, the arms pivoted on said supports, the carrier pivoted on said arms and flexible connections between the said supports and said arms, and a catch mechanism to engage the carrier with one of said arms when the carrier is reversed, substantially as set forth.

4. In a safety attachment for motor-cars, the car and adjustable supports on the front thereof, a spring-fender detachably engaged on said supports, a frame having side arms removably engaged on said supports, a carrier pivoted on said arms and flexible connections between the front ends of said supports and arms, and an automatic lock on said frame to hold the carrier in its reversed position, substantially as set forth.

5. The car and a spring-fender across the front thereof, in combination with a tilting carrier independent of said fender and free from all connections across its rear portion, supports on which said carrier is pivoted forward of its middle portion, said supports having adjustably-fixed elevations, and locking mechanism to hold the carrier down at its rear on a plane beneath its front portion when tilted, and the said fender having stationary supports, substantially as described.

6. The car and the spring-fender apart from the body thereof, in combination with a tilting carrier independent of said fender, supports at the side of the carrier upon which said fender and carrier are supported, means to tilt the carrier down at its front to working position, and a lock on the supporting-frame therefor to engage the carrier and hold it in reversed position, substantially as set forth.

7. The combination of the fender and detachable supports therefor, the carrier mechanically separate from said fender and a frame on which the carrier is pivoted at its sides, said frame being removably engaged upon said fender-supports, and a lock mechanism to hold the carrier in a reversed position, whereby a pick-up is cradled between said fender and carrier, substantially as set forth.

Witness my hand to the foregoing specification this 30th day of June, 1903.

BENJAMIN LEV.

Witnesses:
R. ZBORMK,
R. B. MOSER.